INVENTORS.
ALFRED F. CHOUINARD
EDWARD P. SPENCER
BY
ATTORNEY

June 24, 1958   A. F. CHOUINARD ET AL   2,840,016
ADJUVANT POWDER CONTROL FOR FLAME CUTTING
Original Filed Oct. 31, 1952   2 Sheets-Sheet 2

*INVENTORS.*
ALFRED F. CHOUINARD
EDWARD P. SPENCER
BY
ATTORNEY

United States Patent Office 2,840,016
Patented June 24, 1958

2,840,016

ADJUVANT POWDER CONTROL FOR FLAME CUTTING

Alfred F. Chouinard, Chicago, and Edward P. Spencer, Cary, Ill., assignors to National Cylinder Gas Company, Chicago, Ill., a corporation of Delaware Continuation of application Serial No. 317,912, October 31, 1952. This application June 11, 1956, Serial No. 590,421

4 Claims. (Cl. 110—22)

The present invention relates generally to a system and apparatus for thermochemically cutting metals normally immune to flame cutting with preheat flames and oxygen alone. The cutting method involved proceeds through the action of heating flames, a high pressure oxygen stream and flux-forming adjuvant material delivered with a carrier gas to the work, and this invention specifically provides an improved system for an automatic flow control of the carrier gas and adjuvant material, such as iron powder. This application contains subject matter in common with copending application Serial No. 790,562, filed December 9, 1947, now Patent 2,622,548.

The principal object of this invention is to provide a fully automatic flow control for flux-forming adjuvant material and its carrier gas which is simple in construction and operation and yet is rugged and dependable in operation.

A feature of this invention resides in the provision of a pneumatically operated flow control means which simultaneously controls the flow of powdered adjuvant material and carrier gas, and which maintains a predetermined powder feed or hopper pressure.

These and other features and advantages of the instant invention will become apparent from the description that follows and the accompanying drawings, wherein.

Figure 1:
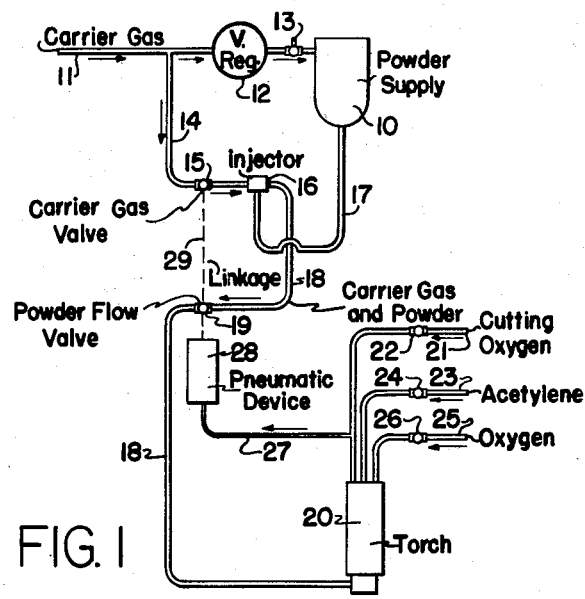
Fig. 1 is a diagrammatic showing of a preferred system embodying this invention.
Figure 2:
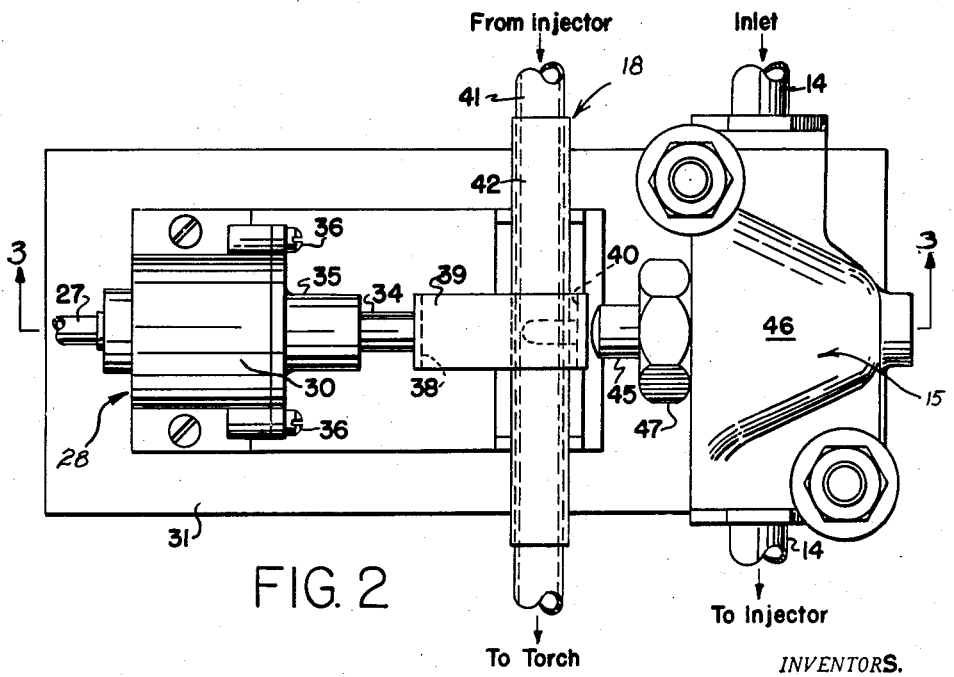
Fig. 2 is a plan view of a preferred embodiment of flow control and pressure maintaining apparatus shown schematically as part of the diagrammatic showing of Fig. 1.

In the system as diagrammatically shown in Fig. 1, there is employed a supply chamber or hopper 10. The hopper 10 may be provided with a removable top (not shown) to facilitate its filling to any desired extent with finely divided flux-formnig adjuvant material, such as iron or other suitable powder, and which may then be closed securely gas-tight to withstand mild pressures and prevent gas under pressure from escaping from the hopper 10.

Carrier gas for the adjuvant material, which may be essentially nitrogen, and which is preferably a mixture therewith of from about 5% to about 38% by volume of hydrogen, is supplied under preselected pressure from a supply source (not shown) through conduit 11. Part of the carrier gas flows into the hopper 10 through a conventional pressure reducing regulating valve 12 and manually operable pressure release valve 13. The regulator 12 is preferably preset to maintain a pressure in the hopper 10 of the order of 5 p. s. i. The release valve 13 is provided merely for bleeding the hopper portion of the system when removal of the hopper top is necessary or desired for any purpose. As will become apparent later, the arrangement of the system is such as to eliminate the necessity for pressure stabilization or constant pressure bleed-off of gas from the hopper. Another portion of the carrier gas flows through branch conduit 14 to injector 16 by way of automatically operable carrier gas shut off valve 15.

Flux forming material or adjuvant powder is drawn from the hopper 10 through conduit 17 by the action of an injector 16 and is entrained with the carrier gas to flow through carrier gas powder conduit 18 to torch 20 by way of powder flow cut off valve 19.

Torch 20 is supplied with high pressure cutting oxygen from a source (not shown) through conduit 21 by way of torch cutting oxygen valve 22; with fuel gas, such as acetylene, for preheat flames through conduit 23 by way of torch fuel gas valve 24; and with fuel gas combustion oxygen through conduit 25 by way of torch valve 26. As these three conduits and torch valves (21–26) are conventional and well known in the art, further description of them is unnecessary.

Downstream of the cutting oxygen torch valve 22 and between it and torch 20, there is a branch control conduit 27 connected to a pneumatic device indicated generally at 28. The operating mechanism of the pneumatic device 28 is mechanically linked to simultaneously operate both the powder flow valve 19 and the carrier gas valve 15, and this mechanical linkage is schematically indicated at 29 in Fig. 1 by the dotted line interconnecting the three members, 28, 19 and 15.

Figure 3:
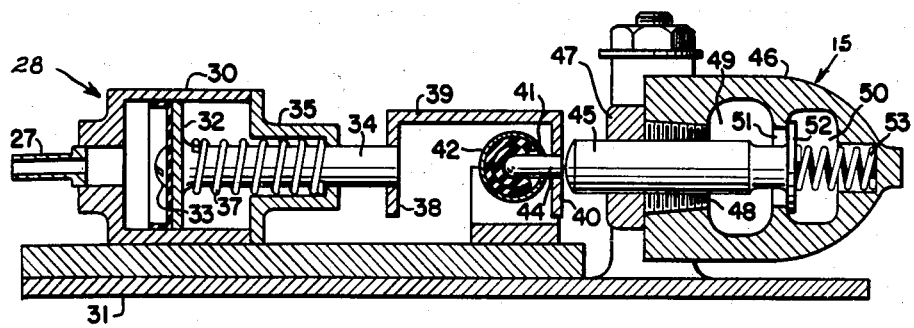
Figs. 3 and 4 are sectional views both taken on line A—A of Fig. 2, showing that portion of the device in non-operating or closed and operating or open positions, respectively.
Figure 4:
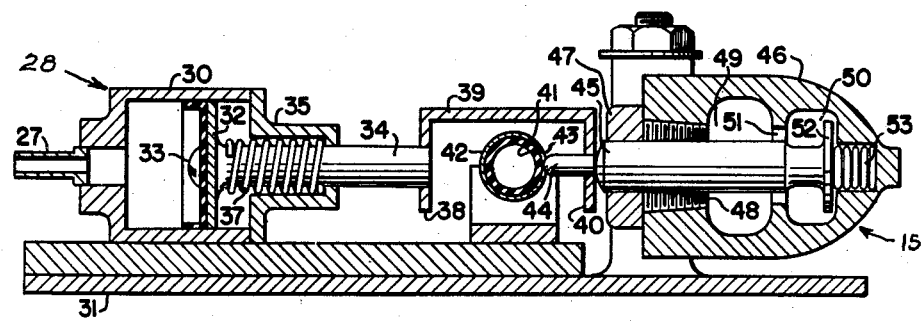

That portion of the system indicated at 15, 19, 28 and 29 in Fig. 1 may be conveniently constructed as follows:

Pneumatic device 28 constitutes a motivating means for the valves 15 and 19, and comprises a cylinder 30 mounted on a base 31. Cylinder 30 is provided with a piston 32 (see Figs. 3 and 4) reciprocable therein. The piston 32 is connected, for example, by screw 33, to a piston rod 34 which slidably extends through an opening in cylinder cover 35 suitably secured to the cylinder 30 by cap screws 36. The piston 32 is biased to its normal position away from the cylinder cover 35 by means of compression spring 37 surrounding the piston rod 34 and positioned within the cylinder 30 between the cylinder cap 35 and the piston 32. The outer end of the piston rod 34 is connected to arm 38 of yoke 39. The yoke 39 straddles a flexible portion 41 of carrier gas and powder conduit 18. Preferebly, this flexible portion 41 consists of a short length of rubber tubing. To obviate possibility of accidental restriction of flexible tubing portion 41, it is encased within a protecting shell or tube 42 of suitably larger diameter but provided with aperture 43 adjacent arm 40 of the yoke 39. In alignment with the opening 43 and connected to the arm 40 of yoke 39 is a short plunger 44 having its free end rounded. In the normal or closed (non-operating) position of the pneumatic device 28 (Fig. 3) the plunger 44 extends through the aperture 43 in the shielding shell 42 pressing into and closing the rubber tubing section 41 of the conduit 18 under the tension of the compression spring 37.

Adjacent the other side of the yoke arm 40 from which the plunger 44 extends is the end of a plunger 45 which extends from a somewhat bell shaped casing 46 of the carrier gas valve 15.

The casing 46 is also mounted on the base 31 and the plunger 45 is arranged to reciprocate within a suitably packed gland nut 47 closing an opening 48 in casing 46 provided for this purpose. Within the casing 46 of valve 15 are two chambers 49 and 50 with a communicating valve passage 51 therebetween. The chamber 49 is connected with the inlet side of conduit 14 while chamber 50 is connected to the outlet side leading to the injector 16. The plunger 45 extends through the passage 51 and terminates in a valve member 52 within chamber 50 normally closing passage 51. The normally closed position of valve 15 is insured by compression spring 53 between valve body 52 and casing 46 biasing valve body 52 into closed position relative to the passage 51.

Operation

The operation of this system is extremely simple and correspondingly rugged and dependable. The regulator 12 is set to control and maintain the desired preselected pressure in powder hopper 10. Torch valve 24 is opened and the fuel gas is ignited. Oxygen valve 26 is then opened and valves 24 and 26 are adjusted to obtain desired heating flames. After the work is suitably preheated and it is desired to begin the cut, only the cutting oxygen valve 22 need be manipulated. As soon as the valve 22 is opened, pressure in conduit 21 is transferred by the control conduit 27 to cylinder 30. Pressure behind piston 32 moves the piston to the position illustrated in the sectional view of Fig. 4. Piston rod 34 and yoke 39 move to the right as viewed in the drawing withdrawing plunger 44 from shell 42 thus opening tubing 41. Simultaneously, the yoke arm 40 moves gas valve plunger 45 and valve body 50 to the right thereby opening valve passage 51. Carrier gas flows through gas valve 15 and through the injector 16 causing adjuvant powder to be entrained with carrier gas and delivered through conduit 18 and the powder valve section or tubing 41 to the torch 20.

When the cut is completed or should it be desired to halt the cutting, only the cutting oxygen valve 22 need be closed. The pressure in cylinder 30 of pneumatic device 28 immediately bleeds off through the torch, and the compression springs 37 and 50 restore piston 32 and valve body 52, respectively, to their positions shown in Fig. 3 thereby stopping the flow of powder through rubber tubing section 41 of the powder flow valve 19 and closing valve passage 51 in the gas valve 15 to further passage of carrier gas to the injector 16. With both the valves 15 and 19 instantaneously closed, the higher pressure in carrier gas conduit 14 cannot bleed into or cause any increase in the desired powder delivery pressure within hopper 10. Moreover, the carrier gas within the hopper 10 is not permitted to bleed off through the injector to the torch because the valve 19 is also closed. Accordingly, the system is maintained in equilibrium and in complete readiness for the next cutting operation without the hazard of a surge or sudden excess delivery of powder when next cutting operation is begun.

It will be understood that such modifications and changes as will suggest themselves to those skilled in the art which come within the true spirit of this invention are included as being within the scope of this invention best defined in the appended claims.

This application is a continuation of our application Serial No. 317,912 filed October 31, 1952, now abandoned, and is substituted therefor.

We claim:

1. Apparatus for thermochemically cutting metal by the action of heating flames, a high pressure oxygen stream, and powdered adjuvant material delivered to the work with a carrier gas derived from a source thereof under pressure, comprising in combination theewith a hopper normally closed to atmosphere for containing a supply of powdered adjuvant material and provided with a gas inlet and an outlet, a pressure regulating valve upstream of said gas inlet for maintaining said adjuvant material under a constant predetermined gas pressure, conduit means including said outlet and an injector for effecting the entrainment of said adjuvant material in said carrier gas and for delivering said material and the carrier gas to the work, a portion of said conduit means for delivering carrier gas only from the source thereof to the injector, a first valve in said portion of the conduit means, motivating means for operating said valve to regulate the flow of carrier gas through said portion of the conduit means and of adjuvant material through the remainder of said conduit means, and a second valve in said remainder of the conduit means simultaneously operable with said first valve by said motivating means, said valves insuring without loss of carrier gas the maintenance of said constant predetermined gas pressure on the supply of adjuvant material contained in said hopper when the adjuvant material is not flowing.

2. Apparatus for thermochemically cutting metal by the action of heating flames, a high pressure oxygen stream, and powdered adjuvant material delivered to the work with a carrier gas derived from a source thereof under pressure, comprising in combination therewith a hopper normally closed to atmosphere for containing a supply of powdered adjuvant material and provided with a gas inlet and an outlet, a pressure regulating valve upstream of said gas inlet for maintaining said adjuvant material under a constant predetermined gas pressure, conduit means including said outlet and an injector for effecting the entrainment of said adjuvant material in said carrier gas and for delivering said material and the carrier gas to the work, a portion of said conduit means for delivering carrier gas only from the source thereof to the injector, a first valve in said portion of the conduit means, motivating means for operating said valve to regulate the flow of carrier gas through said portion of the conduit means and of adjuvant material through the remainder of said conduit means, and a second valve in said remainder of the conduit means simultaneously operable with said first valve by said motivating means, said valves for starting and stopping the flow of carrier gas and of adjuvant material and for insuring without loss of carrier gas the maintenance of the constant predetermined gas pressure on the supply of adjuvant material contained in said hopper when the adjuvant material is not flowing by preventing gas from passing through the injector, said supply of adjuvant material contained in said hopper being at a constant predetermined lesser pressure than the pressure of the carrier gas in said portion of the conduit means.

3. Apparatus for thermochemically cutting metal by the action of heating flames, a high pressure oxygen stream, and powdered adjuvant material delivered to the work with a carrier gas derived from a source thereof under pressure, comprising in combination therewith a hopper normally closed to atmosphere for containing a supply of powdered adjuvant material and provided with a gas inlet and an outlet, a pressure regulating valve upstream of said gas inlet for maintaining said adjuvant material under a constant predetermined gas pressure, conduit means including said outlet and an injector for effecting the entrainment of said adjuvant material in said carrier gas and for delivering said material and the carrier gas to the work, a portion of said conduit means for delivering carrier gas only from the source thereof to the injector, a first valve in said portion of the conduit means, motivating means comprising a pneumatic device operable under pressure from the high pressure oxygen stream for operating said valve to regulate the flow of carrier gas through said portion of the conduit means and of adjuvant material through the remainder of said conduit means, and another valve in said remainder of the conduit means simultaneously operable with said first valve by said pneumatic motivating means, said valves insuring without loss of carrier gas the maintenance of the constant predetermined gas pressure on the supply of adjuvant material contained in said hopper when the adjuvant material is not flowing.

4. Apparatus for thermochemically cutting metal by the action of heating flames, a high pressure oxygen stream, and powdered adjuvant material delivered to the work with a carrier gas derived from a source thereof under pressure, comprising in combination therewith a hopper normally closed to atmosphere for containing a supply of powdered adjuvant material and provided with a gas inlet and an outlet, a pressure regulating valve upstream of said gas inlet for maintaining said adjuvant material under a constant predetermined gas pressure, conduit means including said outlet and an injector for effecting the entrainment of said adjuvant material in said carrier gas and for delivering said material and the carrier gas to the work, a portion of said conduit means for delivering carrier gas only from the source thereof to the injector and a second portion of said conduit means for carrying adjuvant material from said injector, a first valve in said portion of the conduit means, and a second valve in said second portion of the conduit means downstream of said injector, said valves for controlling the flow of said carrier gas and an adjuvant material and for insuring without loss of carrier gas the maintenance of the constant predetermined gas pressure on the supply of adjuvant material contained in said hopper by preventing gas from passing through the injector, pneumatically operable piston means connected to both of said valves for simultaneous operation thereof, and a high pressure oxygen stream torch valve, said pneumatically operated piston means being operable by pressure from said high pressure oxygen stream downstream of said torch valve.

References Cited in the file of this patent

UNITED STATES PATENTS

| | | |
|---|---|---|
| 806,904 | Mullin | Dec. 12, 1905 |
| 2,491,440 | Boedecker et al. | Dec. 13, 1949 |
| 2,608,446 | La Pota | Aug. 26, 1952 |
| 2,622,548 | Chouinard et al. | Dec. 23, 1952 |